(12) United States Patent
Simionescu et al.

(10) Patent No.: US 10,649,906 B2
(45) Date of Patent: May 12, 2020

(54) METHOD AND SYSTEM FOR HARDWARE ACCELERATED ROW LOCK FOR A WRITE BACK VOLUME

(71) Applicant: Avago Technologies International Sales Pte. Limited, Singapore (SG)

(72) Inventors: Horia Simionescu, Foster City, CA (US); Timothy Hoglund, Colorado Springs, CO (US); Sridhar Rao Veerla, Bangalore (IN); Panthini Pandit, Bangalore (IN); Gowrisankar Radhakrishnan, Colorado Springs, CO (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 21 days.

(21) Appl. No.: 15/966,330

(22) Filed: Apr. 30, 2018

(65) Prior Publication Data

US 2019/0332541 A1  Oct. 31, 2019

(51) Int. Cl.
*G06F 12/08* (2016.01)
*G06F 12/0888* (2016.01)
*G06F 12/0891* (2016.01)

(52) U.S. Cl.
CPC ...... *G06F 12/0888* (2013.01); *G06F 12/0891* (2013.01); *G06F 2212/1056* (2013.01)

(58) Field of Classification Search
CPC ............ G06F 12/0864; G06F 12/0871; G06F 12/0888; G06F 12/0891; G06F 12/126; G06F 2212/1056
USPC .......................................... 711/135, 152, 216
See application file for complete search history.

(56) References Cited

U.S. PATENT DOCUMENTS

| | | | |
|---|---|---|---|
| 6,460,122 B1 | 10/2002 | Otterness et al. | |
| 7,822,927 B1 * | 10/2010 | Scheer ................ | G06F 12/0866 707/829 |
| 8,504,542 B2 | 8/2013 | Chang et al. | |
| 9,460,144 B2 | 10/2016 | Brower et al. | |
| 2017/0351432 A1 * | 12/2017 | Ash ..................... | G06F 12/0804 |
| 2019/0034345 A1 * | 1/2019 | Hu ....................... | G06F 12/0884 |

\* cited by examiner

*Primary Examiner* — Gary J Portka
(74) *Attorney, Agent, or Firm* — Sheridan Ross P.C.

(57) ABSTRACT

A system and method for efficient cache flushing are provided. The disclosed method includes maintaining a data structure in connection with a plurality of blocks used for data caching, the data structure including a row lock wait list section. The method further includes receiving an Input/Output (I/O) request, performing a hash search for the I/O request against the data structure, and based on the results of the hash search, locking at least one row in a data cache thereby preventing read and write operations from being performed on the at least one row until the at least one row is unlocked.

18 Claims, 13 Drawing Sheets

US 10,649,906 B2

METHOD AND SYSTEM FOR HARDWARE ACCELERATED ROW LOCK FOR A WRITE BACK VOLUME

FIELD OF THE DISCLOSURE

The present disclosure is generally directed toward computer memory.

BACKGROUND

Multiple threads working on various I/O requests in parallel may result in performing flush operation on the same row. Because of this, the threads may need to be serialized especially for Raid 5/6 volumes where the parity needs to be updated. Traditional caching algorithms in MegaRAID inherently require region locks to avoid data inconsistency especially for Raid 5/6 volumes. The region locks ensure that writes and reads processing is not overlapped but this, unfortunately, results in reduced performance.

In hardware accelerated caching solutions which are required to provide very high Input/output Operations Per Second (IOPS) and low latency levels required for managing high performance SSD configurations, the region locks are avoided so that reads and writes are processed concurrently. Reads to degraded volumes where there is a cache miss may involve reading all the drives in a row to rebuild the data for the missing arms. Consequently, a flush operation on the row on which a degraded read is in progress needs to be avoided.

BRIEF DESCRIPTION OF THE DRAWINGS

The present disclosure is described in conjunction with the appended figures, which are not necessarily drawn to scale.

DETAILED DESCRIPTION

Figure 1:
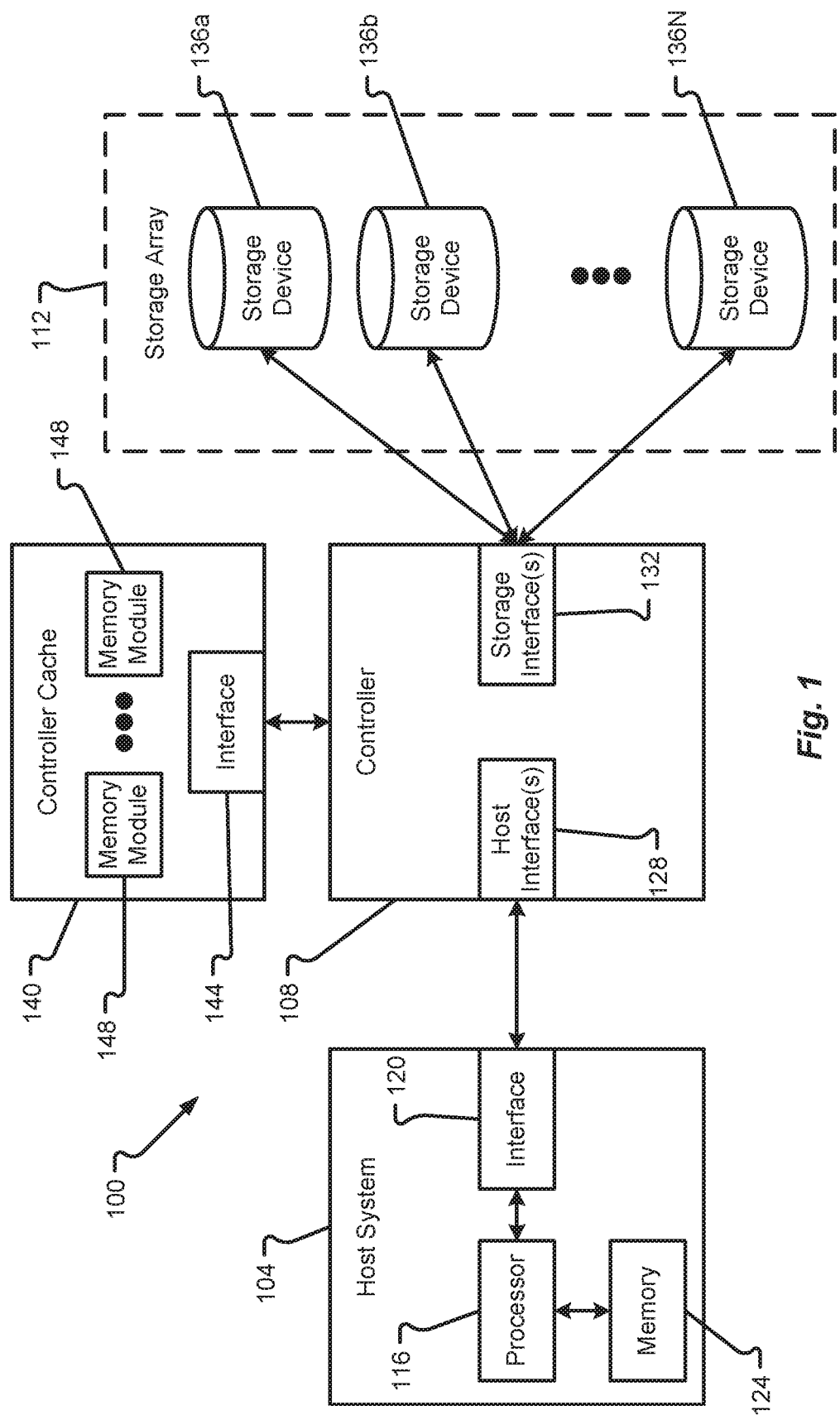
FIG. 1 is a block diagram depicting a computing system in accordance with at least some embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It is being understood that various changes may be made in the function and arrangement of elements without departing from the spirit and scope of the appended claims.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

As will be discussed in further detail herein, the present disclosure proposes a solution which replaces current firmware-driven implementations with hardware managed flows (both control and data paths), using optimizations for hardware I/O processing. The proposed method, in some embodiments, provides a mechanism where a region lock is avoided in the I/O processing. Another aspect of the present disclosure is to ensure that while a flush is in process the reads can still be processed. Another aspect of the present disclosure is to ensure that while a read is in progress on degraded volume, a flush request is not allowed.

As can be appreciated, in hardware accelerated caching solutions which aim for very high IOPs and low latency levels it is required to avoid all the artificial bottle necks caused by traditional region lock mechanisms. The proposed method achieves that by using the locks at very granular level.

Another aspect of the present disclosure is to allow the processing of reads commands and write commands concurrently without the need of region locks on optimal volumes, which enables hardware accelerated caching solutions to provide very high TOPS and low latency levels.

Another aspect of the present disclosure is that when there is a full cache hit for host read operations, the proposed framework ensures that there is no lock required.

Another aspect of the present disclosure is that locking for flush for Raid 5/6 write through volumes provides implicit write coalescing for the I/O commands (e.g., read or write commands) that are received after the flush is started.

Another aspect of the present disclosure is to provide an implicit mechanism by using the outstanding read count, thereby ensuring that when reads are in progress a flush is avoided on degraded volumes.

Another aspect of the present disclosure is that the wait lists and active list are maintained within the cache row, thereby avoiding the need for maintaining separate lists.

Although embodiments of the present disclosure will be described in connection with managing a RAID architecture (e.g., a RAID-5 or RAID-6 type of architecture), it should be appreciated that embodiments of the present disclosure are not so limited. In particular, any controller that finds benefits associated with buffer allocation strategies and/or hardware acceleration can implement some or all of the functions and features described herein.

With reference to FIGS. 1-9I, various embodiments of the present disclosure will be described. While many of the examples depicted and described herein will relate to RAID architecture, it should be appreciated that embodiments of the present disclosure are not so limited. Indeed, aspects of the present disclosure can be used in any type of computing system and/or memory environment. In particular, embodiments of the present disclosure can be used in any type of caching scheme (whether employed by a RAID controller or some other type of device used in a communication system). In particular, solid state drives, hard drives, solid state/hard drive controllers (e.g., SCSI controllers, SAS controllers, or RAID controllers) may be configured to implement embodiments of the present disclosure. As another example, network cards or the like having cache memory may also be configured to implement embodiments of the present disclosure.

With reference now to FIG. 1, additional details of a computing system 100 capable of implementing hashing methods and various cache lookup techniques will be described in accordance with at least some embodiments of the present disclosure. The computing system 100 is shown to include a host system 104, a controller 108 (e.g., a SCSI controller, a SAS controller, a RAID controller, etc.), and a storage array 112 having a plurality of storage devices 136a-N therein. The system 100 may utilize any type of data storage architecture. The particular architecture depicted and described herein (e.g., a RAID architecture) should not be construed as limiting embodiments of the present disclosure. If implemented as a RAID architecture, however, it should be appreciated that any type of RAID scheme may be employed (e.g., RAID-0, RAID-1, RAID-2, . . . , RAID-5, RAID-6, etc.).

In a RAID-0 (also referred to as a RAID level 0) scheme, data blocks are stored in order across one or more of the storage devices 136a-N without redundancy. This effectively means that none of the data blocks are copies of another data block and there is no parity block to recover from failure of a storage device 136. A RAID-1 (also referred to as a RAID level 1) scheme, on the other hand, uses one or more of the storage devices 136a-N to store a data block and an equal number of additional mirror devices for storing copies of a stored data block. Higher level RAID schemes can further segment the data into bits, bytes, or blocks for storage across multiple storage devices 136a-N. One or more of the storage devices 136a-N may also be used to store error correction or parity information.

A single unit of storage can be spread across multiple devices 136a-N and such a unit of storage may be referred to as a stripe. A stripe, as used herein and as is well known in the data storage arts, may include the related data written to multiple devices 136a-N as well as the parity information written to a parity storage device 136a-N. In a RAID-5 (also referred to as a RAID level 5) scheme, the data being stored is segmented into blocks for storage across multiple devices 136a-N with a single parity block for each stripe distributed in a particular configuration across the multiple devices 136a-N. This scheme can be compared to a RAID-6 (also referred to as a RAID level 6) scheme in which dual parity blocks are determined for a stripe and are distributed across each of the multiple devices 136a-N in the array 112.

One of the functions of the controller 108 is to make the multiple storage devices 136a-N in the array 112 appear to a host system 104 as a single high capacity disk drive. Thus, the controller 108 may be configured to automatically distribute data supplied from the host system 104 across the multiple storage devices 136a-N (potentially with parity information) without ever exposing the manner in which the data is actually distributed to the host system 104.

In the depicted embodiment, the host system 104 is shown to include a processor 116, an interface 120, and memory 124. It should be appreciated that the host system 104 may include additional components without departing from the scope of the present disclosure. The host system 104, in some embodiments, corresponds to a user computer, laptop, workstation, server, collection of servers, or the like. Thus, the host system 104 may or may not be designed to receive input directly from a human user.

The processor 116 of the host system 104 may include a microprocessor, central processing unit (CPU), collection of microprocessors, or the like. The memory 124 may be designed to store instructions that enable functionality of the host system 104 when executed by the processor 116. The memory 124 may also store data that is eventually written by the host system 104 to the storage array 112. Further still, the memory 124 may be used to store data that is retrieved from the storage array 112. Illustrative memory 124 devices may include, without limitation, volatile or non-volatile computer memory (e.g., flash memory, RAM, DRAM, ROM, EEPROM, etc.).

The interface 120 of the host system 104 enables the host system 104 to communicate with the controller 108 via a host interface 128 of the controller 108. In some embodiments, the interface 120 and host interface(s) 128 may be of a same or similar type (e.g., utilize a common protocol, a common communication medium, etc.) such that commands issued by the host system 104 are receivable at the controller 108 and data retrieved by the controller 108 is transmittable back to the host system 104. The interfaces 120, 128 may correspond to parallel or serial computer interfaces that utilize wired or wireless communication channels. The interfaces 120, 128 may include hardware that enables such wired or wireless communications. The communication protocol used between the host system 104 and the controller 108 may correspond to any type of known host/memory control protocol. Non-limiting examples of protocols that may be used between interfaces 120, 128 include SAS, SATA, SCSI, FibreChannel (FC), iSCSI, ATA over Ethernet, InfiniBand, or the like.

The controller 108 may provide the ability to represent the entire storage array 112 to the host system 104 as a single high volume data storage device. Any known mechanism can be used to accomplish this task. The controller 108 may help to manager the storage devices 136a-N (which can be hard disk drives, sold-state drives, or combinations thereof) so as to operate as a logical unit. In some embodiments, the controller 108 may be physically incorporated into the host device 104 as a Peripheral Component Interconnect (PCI) expansion (e.g., PCI express (PCI)e) card or the like. In such situations, the controller 108 may be referred to as a RAID adapter.

The storage devices 136a-N in the storage array 112 may be of similar types or may be of different types without departing from the scope of the present disclosure. The storage devices 136a-N may be co-located with one another or may be physically located in different geographical locations. The nature of the storage interface 132 may depend upon the types of storage devices 136a-N used in the storage array 112 and the desired capabilities of the array 112. The storage interface 132 may correspond to a virtual interface or an actual interface. As with the other interfaces described herein, the storage interface 132 may include serial or parallel interface technologies. Examples of the storage interface 132 include, without limitation, SAS, SATA, SCSI, FC, iSCSI, ATA over Ethernet, InfiniBand, or the like.

The controller 108 is shown to have communication capabilities with a controller cache 140. While depicted as being separate from the controller 108, it should be appreciated that the controller cache 140 may be integral to the controller 108, meaning that components of the controller 108 and the controller cache 140 may be contained within a single physical housing or computing unit (e.g., server blade). The controller cache 140 is provided to enable the controller 108 to perform caching operations. The controller 108 may employ caching operations during execution of I/O commands received from the host system 104. Depending upon the nature of the I/O command and the amount of information being processed during the command, the controller 108 may require a large number of cache memory modules 148 (also referred to as cache memory) or a smaller number of cache memory modules 148. The memory modules 148 may correspond to flash memory, RAM, DRAM, DDR memory, or some other type of computer memory that is quickly accessible and can be rewritten multiple times. The number of separate memory modules 148 in the controller cache 140 is typically larger than one, although a controller cache 140 may be configured to operate with a single memory module 148 if desired.

The cache interface 144 may correspond to any interconnect that enables the controller 108 to access the memory modules 148, temporarily store data thereon, and/or retrieve data stored thereon in connection with performing an I/O command or some other executable command. In some embodiments, the controller cache 140 may be integrated with the controller 108 and may be executed on a CPU chip or placed on a separate chip within the controller 108. In such a scenario, the interface 144 may correspond to a separate bus interconnect within the CPU or traces connecting a chip of the controller cache 140 with a chip executing the processor of the controller 108. In other embodiments, the controller cache 140 may be external to the controller 108 in which case the interface 144 may correspond to a serial or parallel data port.

Figure 2:
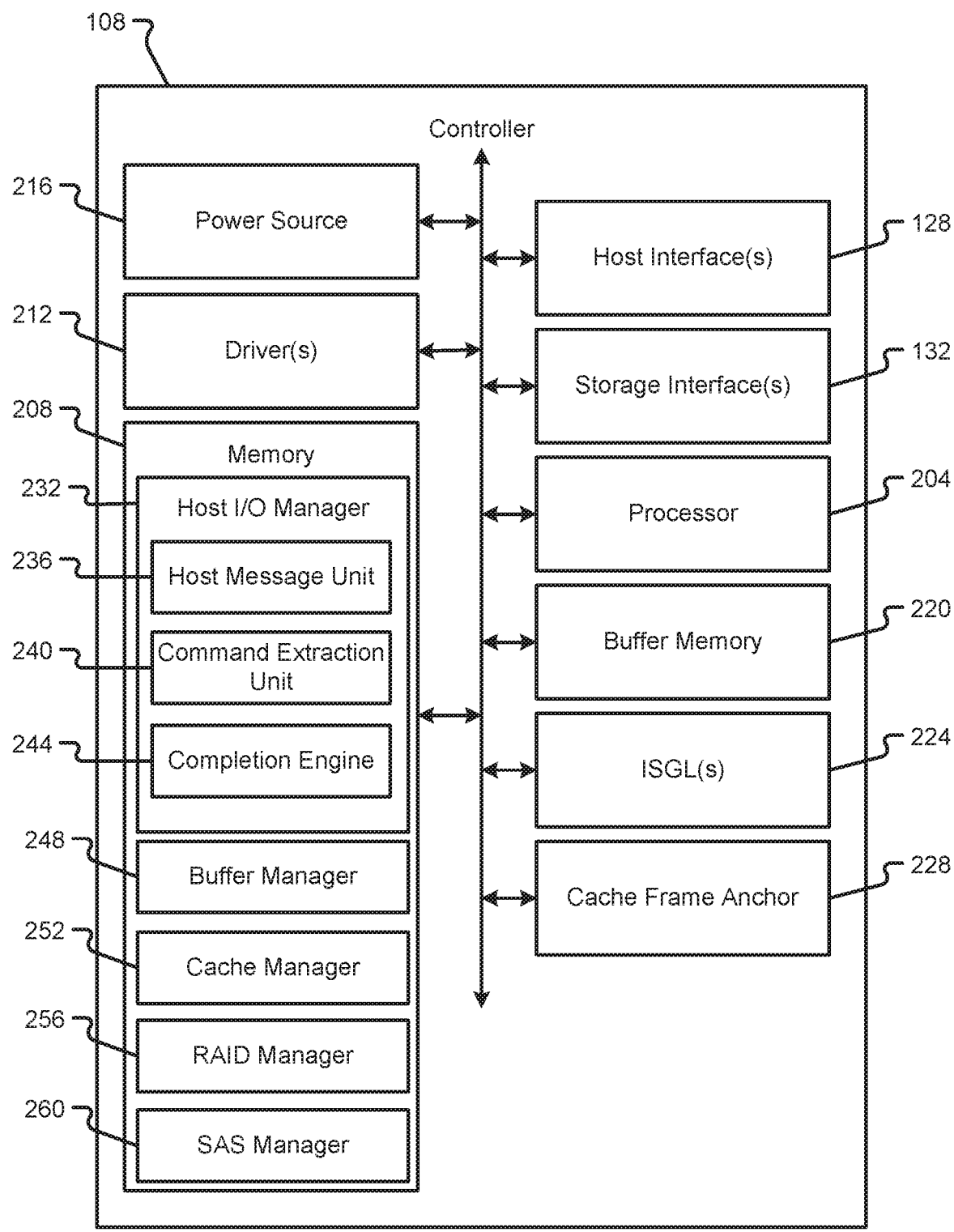
FIG. 2 is a block diagram depicting details of an illustrative controller in accordance with at least some embodiments of the present disclosure.

With reference now to FIG. 2 additional details of a controller 108 will be described in accordance with at least some embodiments of the present disclosure. The controller 108 is shown to include the host interface(s) 128 and storage interface(s) 132. The controller 108 is also shown to include a processor 204, memory 208 (e.g., a main controller memory), one or more drivers 212, and a power source 216.

The processor 204 may include an Integrated Circuit (IC) chip or multiple IC chips, a CPU, a microprocessor, or the like. The processor 204 may be configured to execute instructions in memory 208 that are shown to include a host I/O manager 232, a buffer manager 248, a cache manager 252, a RAID manager 256, and a SAS manager 260. Furthermore, in connection with performing caching or buffer functions, the processor 204 may utilize buffer memory 220, one or more Internal Scatter Gather Lists (ISGLs) 224, and a cache frame anchor 228. The host I/O manager 232 is shown to include a plurality of sub-routines that include, without limitation, a host message unit 236, a command extraction unit 240, and a completion engine 244.

Each of the components (e.g., host I/O manager 232, buffer manager 248, cache manager 252, RAID manager 256, and SAS manager 260) may correspond to different functional blocks that operate in their own local memory loading the global memory (e.g. a global buffer memory 220 or memory 208) on an as-needed basis. Each of these different functional blocks can be accelerated by different hardware threads without departing from the scope of the present disclosure.

The memory 208 may be volatile and/or non-volatile in nature. As indicated above, the memory 208 may include any hardware component or collection of hardware components that are capable of storing instructions and communicating those instructions to the processor 204 for execution. Non-limiting examples of memory 208 include RAM, ROM, flash memory, EEPROM, variants thereof, combinations thereof, and the like. Similarly, the buffer memory 220 may be volatile or non-volatile in nature. The buffer memory may be configured for multiple read/writes and may be adapted for quick access by the processor 204.

The instructions stored in memory 208 are shown to be different instruction sets, but it should be appreciated that the instructions can be combined into a smaller number of instruction sets without departing from the scope of the present disclosure. The host I/O manager 232, when executed, enable the processor 204 to manage I/O commands received from the host system 104 and facilitate higher-level communications with the host system 104. In some embodiments, the host I/O manager 232 may utilize the host message unit 236 to process incoming messages received from the host system 104. As a non-limiting example, the controller 108 may receive messages from the host system 104 in an MPI protocol. The host message unit 236 may bring down the messages received from the host system 104 and pass the content of the messages to the command extraction unit 240. The command extraction unit 240 may be configured to determine if a particular command in a message is acceleratable (e.g., capable of being passed to a particular functional block to facilitate hardware acceleration). If a command is determined to be acceleratable, then the command extraction unit 240 may implement a hardware acceleration process and generate an appropriate Local Message ID (LMID) that represents all of the information received from the host system 104 (in the command). The LMID effectively represents the command received from the host system 104, but is in a different format that is understandable by the managers 248, 252, 256, 260. The command extraction unit 240 may, in some embodiments, route the various commands (e.g., LMIDs) to one or more of the buffer manager 248, cache manager 252, RAID manager 256, and SAS manager 260. The routing of the commands may depend upon a type of the command and the function to be executed. The completion engine of the host I/O manager 232 may be responsible for reporting to the host system 104 that an I/O command has been completed by the controller 108.

The buffer manager 248 may include instructions that, when executed, enable the processor 204 to perform various buffer functions. As an example, the buffer manager 248 may enable the processor 204 to recognize a write command and utilize the buffer memory 220 in connection with executing the write command. In some embodiments, any command or function that leverages the buffer memory 220 may utilize the buffer manager 248.

The cache manager 252 may include instructions that, when executed, enable the processor 204 to perform various caching functions. The cache manager 252 may enable the processor 204 to communicate with the controller cache 140 and leverage the memory modules 148 of the controller cache 140. The cache manager 252 may also manage the creation and lifecycle of cache frame anchors 228 and/or ISGLs 224. As an example, as caching functions are executed, one or more cache frame anchors 228 may be created or utilized to facilitate the caching function. As used herein, an ISGL may represent the snapshot of data at a given point in time it is used. In some embodiments, the ISGL is capable of encapsulating all the metadata that is required for an I/O request (e.g. read request, write request, etc.), thereby providing an efficient communication mechanism between various modules for processing the read/write and/or read-ahead operations.

The RAID manager 256 and/or SAS manager 260 may include instructions that, when executed, enable the processor 204 to communicate with the storage array 112 or storage devices 136 therein. In some embodiments, the RAID manager 256 and/or SAS manager 260 may receive commands either directly from the host I/O manager 232 (if no caching was needed) or they may receive commands from the cache manager 252 after an appropriate caching process has been performed. When invoked, the RAID manager 256 and/or SAS manager 260 may enable the processor 204 to finalize read or write commands and exchange data with the storage array 112. Other functions enabled by the RAID manager 256 and/or SAS manager 260 will be described in further detail herein.

The driver(s) 212 may comprise firmware, hardware, software, or combinations thereof that enable the processor 204 to make use of other hardware components in the controller 108. For instance, different drivers 212 may be provided to support functions of the interfaces 128, 132. As another example, separate drivers 212 may be provided to support functions of the buffer memory 220. The drivers 212 may perform the low-level routines that allow the processor 204 to communicate with the other hardware components and respond to commands received from the processor 204.

The power source 216 may correspond to hardware components that provide the controller 108 with the power necessary to run the processor 204 and other components. As an example, the power source 216 may correspond to a power converter that receives AC power from an external source (e.g., a power outlet) and converts the AC power into DC power that is useable by the other hardware components of the controller 108. Alternatively or additionally, the power source 216 may correspond to an internal power source (e.g., a battery pack, bank of capacitors, etc.) that provides power to the hardware components of the controller 108.

Figure 3:
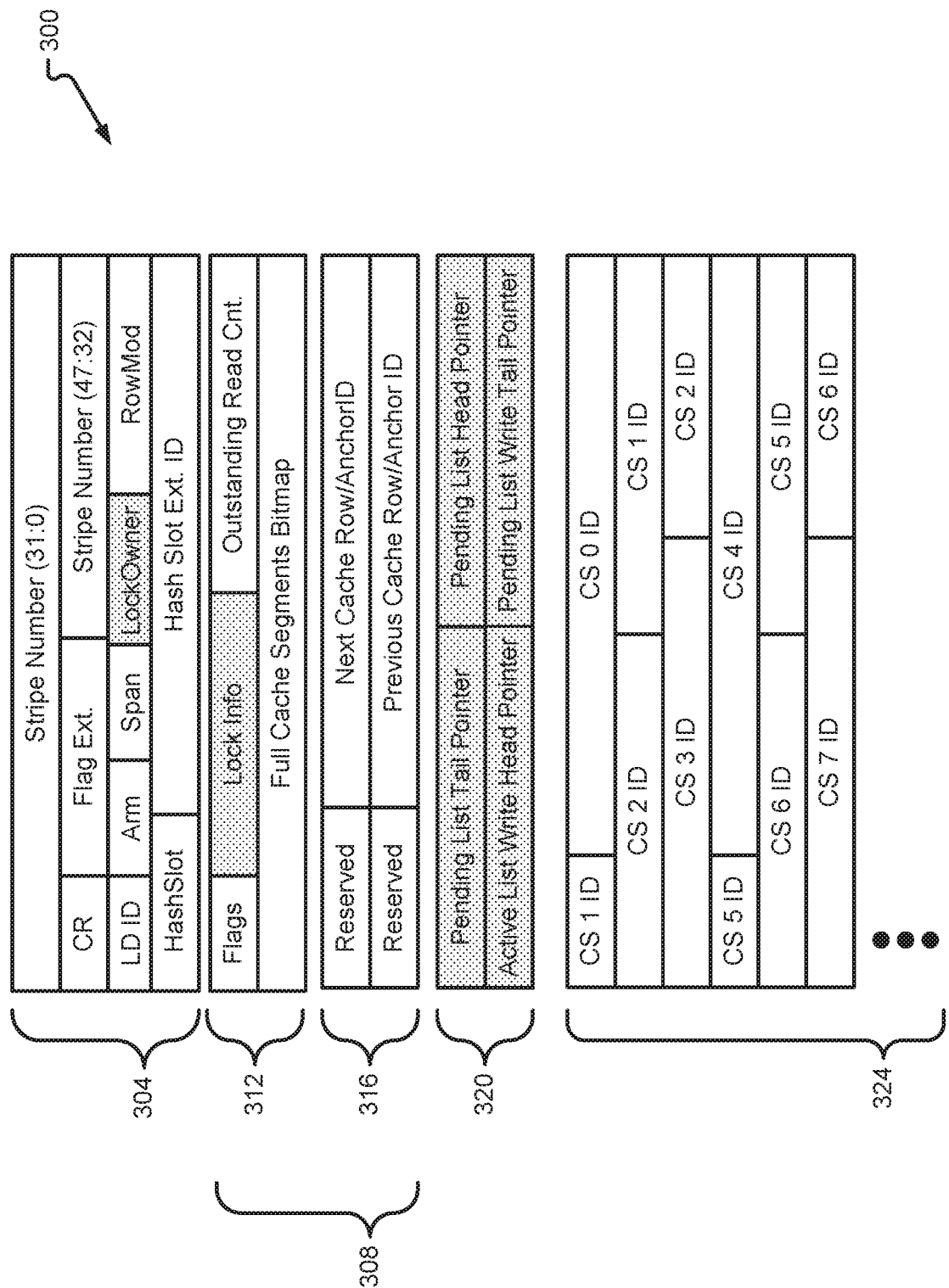
FIG. 3 is a block diagram depicting details of a first data structure used in accordance with at least some embodiments of the present disclosure.

With reference now to FIG. 3, additional details of a first data structure 300 will be described in accordance with at least some embodiments of the present disclosure. The first data structure 300 may be used to store cache row frame metadata. As a non-limiting example, the first data structure 300 may correspond to part or all of a cache frame anchor 228. Although FIG. 3 shows the data structure 300 as having a particular layout/organizational structure, it should be appreciated that the data structure 300 may be configured in any number of ways without departing from the scope of the present disclosure. The data structure 300 may correspond to a data structure that is created and managed by the cache manager 252 or other components in memory 208.

The data structure 300 is shown to include a hash section 304 as well as a dirty list section 308 that includes first and second sub-sections 312, 316, respectively. The data structure 300 is also shown to include a row lock wait list section 320 and a strips section 324. The various sections of the data structure 300 may be used to store data that enables the controller 208 to utilize variable stripe sizes, thereby taking advantage of different workloads (where different types of commands require different amounts of memory and processing capabilities). In some embodiments, the cache manager 252 shouldn't need to worry about strip sizes, but it would be desirable to enable the cache manager 252 to effectively and efficiently respond to different types of commands (e.g., read or write commands) in an appropriate way.

In some embodiments, the hash section 304 includes a number of fields usable in connection with hash searches and other data lookup routines. As a non-limiting example, the hash section 304 may include a strip/stripe number field, a CR field, a flags extension field, a Logical Disk (LD) ID field, an Arm field, a Span field, a LockOwner field, a RowMod field, a hash slot field and a hash slot extension ID field.

The strip/stripe number field may store data that identifies the strip/stripe for which the data structure 300 is being used. In some embodiments, the strip/stripe field may uniquely identify a strip or stripe. In some embodiments, the strip/stripe field may identify a memory location (e.g., a starting location) of a strip or stripe of data stored in a storage device 136. For instance, the strip/stripe field may store a number that has been assigned to a particular strip or stripe of data.

The flag extension field may store information describing a memory location of a flag or an identifier of a flag associated with the data structure 300. Various types of flags may be used to identify a type of data stored in connection with the data structure 300 and the flag extension field may be used to identify that type of data.

The LD ID field may contain an identifier or multiple identifiers of logical disks used to store the data. The logical disk may be identified by a memory location or by some alias used in a naming scheme for the logical disks being managed by the controller 108.

The arm field may store a current value of a logical arm parameter. The Span field may store a value describing the span number in the Raid Volume (In case of single span the value is 0). The LockOwner field may include information describing a row lock, an owner of a row lock, a reason for the row lock, and any other information related to a row lock. The hash slot field and the hash slot extension ID field may contain data describing or uniquely identifying a cache row and/or hash slot extension.

The dirty list section 308 is shown to include a first sub-section 312 and a second sub-section 316. The first sub-section of the dirty list section 308 includes a flags field, a lock information field, an outstanding read count field, and a full cache segments bitmap. The second sub-section 316 is shown to include a next cache row/anchor ID field and a previous cache row/anchor ID field along with one or more additional reserved fields.

The flags field in the dirty list section 308 may contain an identifier of one or more flags associated with the dirty list identified by the data structure 300. The lock information field may contain information identifying whether a particular cache segment or row is locked or not, whether a particular cache segment or row is locked for a flush, and/or whether or not a particular cache segment or row is locked for a flush and a read operation.

The outstanding read count field may contain information describing how many and which cache segments or rows are waiting for a read. Conversely, this particular field may contain information describing a number of outstanding reads that have occurred. The cache segment bitmap may include a link to a bitmap stored in local controller memory or may actually correspond to a bitmap identifying a number and location of valid cache segments for the logical arms associated with the data structure 300.

The second sub-section 316 of the dirty list section 308 may contain information that describes a cache segment in the dirty list LRU. The information contained in this first sub-section 316 may include a number of reserved data fields, a next cache row/anchor identifier field, and a previous cache row/anchor identifier field. The next cache row/anchor identifier field and previous cache row/anchor identifier field may be used to create a linked list of cache segments. This linked list may be used in connection with performing any other operation performable by the controller 108. In some embodiments, the next cache row/anchor identifier field and previous cache row/anchor identifier field may be used to track a balance of a tree/chain structure. The data structure 300 may organize data based on LBA and based on a tree structure. As buffer segments are needed to accommodate the need for more buffer memory 220, the data structure 300 may be updated to reflect the addition of buffer segments to the tree/chain. These cache row/anchor identifier fields may store information that links specific cache segment IDs to one another in this tree/chain structure, thereby facilitating the creation of variable stripe sizes. As the names suggest, the next cache row/anchor identifier may contain information that identifies a next cache row or anchor in a chain of cache rows (relative to a currently allocated cache row) whereas the previous cache row/anchor identifier field may contain information that identifies a previous cache row/anchor in a chain of cache row (relative to the currently allocate cache rows). As additional cache rows are added to the tree/chain, the fields may both be updated to continue tracking the progressive building of the cache segment chain.

The row lock wait list section 320 may include a list of pointers that are used to create lists such as (i) an active wait list and (ii) a pending wait list. The active list may only have a head pointer whereas the pending list is provided with a head and two kinds of tails. Descriptions and locations of these heads and tails for the lists may be maintained within the section 320. In the depicted embodiment, the row lock wait list section 320 includes a pending list tail pointer, a pending list head pointer, an active list write head pointer, and a pending list write tail pointer. The pending list tail pointer may correspond to a field used to represent a tail of the pending list when the Cache Segment (CS)/Row is not part of dirty list. In some embodiments, this is where the read requests get added. The pending list head pointer may correspond to a field used to represent a head of the pending list when the CS/Row is not part of dirty list. This is where the first element of the pending list is accessed. The pending list write tail pointer may correspond to a field used to represent a write pending list when the CS/Row is not part of dirty list. This is where the write requests get added. The active list write head pointer may correspond to a field used to represent the head of the active command list. This list contains all the commands for which a write operation is in progress. It should be noted that when the row lock wait list section 320 is overloaded it can be used as a dirty list based on whether a row lock is active or not. If the lock information field has a predetermined value indicating that there is no current lock, then this field 320 can be interpreted as a dirty list rather than a wait list.

These pointers may actually point to a memory location in the controller or in buffer memory. Alternatively or additionally, the pointers may contain links to appropriate memory locations.

The extents or strips section 324 is shown to include a plurality of extent frames and corresponding cache segment extents. In some embodiments, the extents may store 2 nibbles of data that describe information contained within the section 324. The nibbles in this section 324 represent the extent number of the extent stored in an extent frame. For 1 MB Cache data, there can be max 17 extents (each extent represents 64K data) out of which 1 extent is part of anchor frame and hence extent section represents remaining 16 extents. For example, anchor frame may have extent 5. Extent frame ID0 may have extents 01 and 02. Extent frame ID1 may have extents 00 and 04. Extent frame ID2 may have extents 05 and 06. Extent frame ID3 may have extents 16 and 12 and so on. The extents themselves don't need to be consecutive. By providing the extent frames consecutively in memory (although not a requirement), the extents in the extents section 320 can be scaled to store up to 1 MB of data in total (or more). In some embodiments, each extent can represent up to 64 kB of data. Hence, for a stripe size of 64 kB only one extent that fits in the data structure 300 is needed. For a 1 MB stripe size, sixteen extents would be needed (if each extent represents 64 kB of data), which means that a total of seventeen cache frame anchors would be needed (including the metadata). Although eight extents and extent frames are depicted, it should be appreciated that a greater or lesser number of extents and extent frames can be used without departing from the scope of the present disclosure. By enabling the chaining of multiple extents, variable stripe sizes can be accommodated. In some embodiments, not all extents or extent frames are allocated upon creation of the data structure 300. Instead, extents and extent frames can be allocated on an as-needed basis (e.g., in response to different commands, like a read-ahead command). As can be appreciated, data stored in the data structure 300 may be cleared when the corresponding data is committed to a storage media (e.g., a storage device 136).

Figure 4:
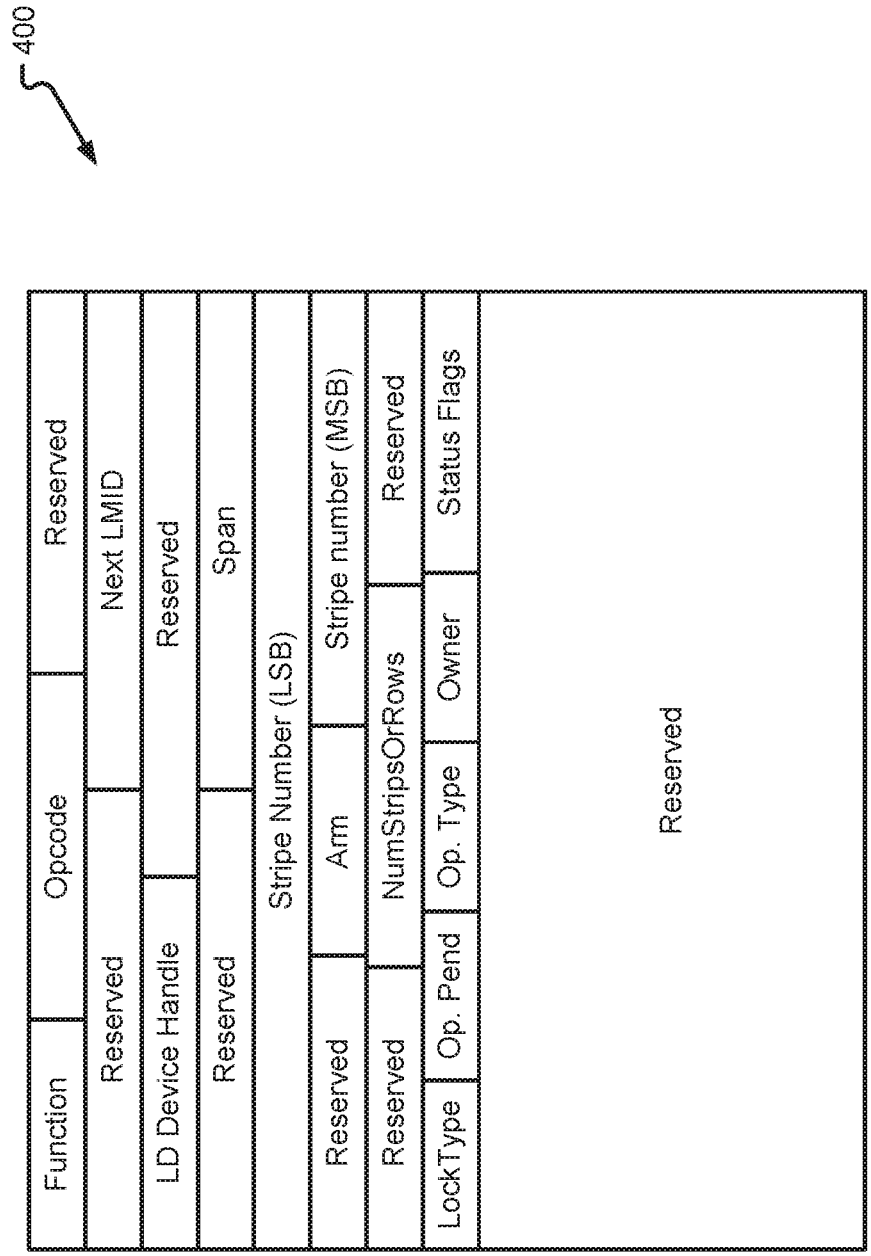
FIG. 4 is a block diagram depicting details of a second data structure used in accordance with at least some embodiments of the present disclosure.

With reference now to FIG. 4, a second data structure 400 will be described in accordance with at least some embodiments of the present disclosure. The second data structure 400 may correspond to an LMID frame or similar message structure that can be used to communicate information between various components, modules, or managers stored in memory 208 of the controller 108.

In some embodiments, the LMID may correspond to an LMID that is used to facilitate a hardware-based row lock process. The data structure 400 is shown to include a function identification field, an operational code field, a next LMID identification field, a device handle field, a span field, a stripe number field, an arm field, a second stripe number field, a number of strips/rows field, a lock type field, an operation pending field, an operation type field, an owner field, and a status flags field.

Some or all of these fields may be used in connection with performing a buffering process, a flush process, a row lock process, etc. The data structure 400 is specifically useful to enable certain managers (e.g., the cache manager 252 and buffer manager 248) to communicate with one another and coordinate their efforts with respect to performing a particular process.

In some embodiments, the lock type field is used to describe the lock type requested for a row lock operation. As such, the lock type field may include information describing whether an identified row is reserved, locked for a flush, or locked for a flush and concurrent read operation.

The operation pending field may correspond to a data field or single bit used to indicate whether a particular operation is pending for a row identified in the stripe number field. The operation pending field may indicate when an LMID will be pended to a row that is locked with and/or when a row lock is to be released.

The operation type may indicate one or two conditions. The first condition that may be indicated by the operation type is whether the LMID is an instruction to release a row lock for a particular row identified in the stripe number. The second condition that may be indicated by the operation type is whether the LMID is an instruction for a row lock request for a particular row identified in the stripe number.

The operation type may indicate the type of operation to be performed in accordance with execution of the LMID. This operation type may have a corresponding code that is described within the operation code field.

The owner field may provide some indication of the module that has transmitted the LMID. In some embodiments, the owner field may identify or provide a mechanism for identifying the requesting module that transmitted the LMID (e.g., an eventual owner of a row lock request).

Figure 5A:
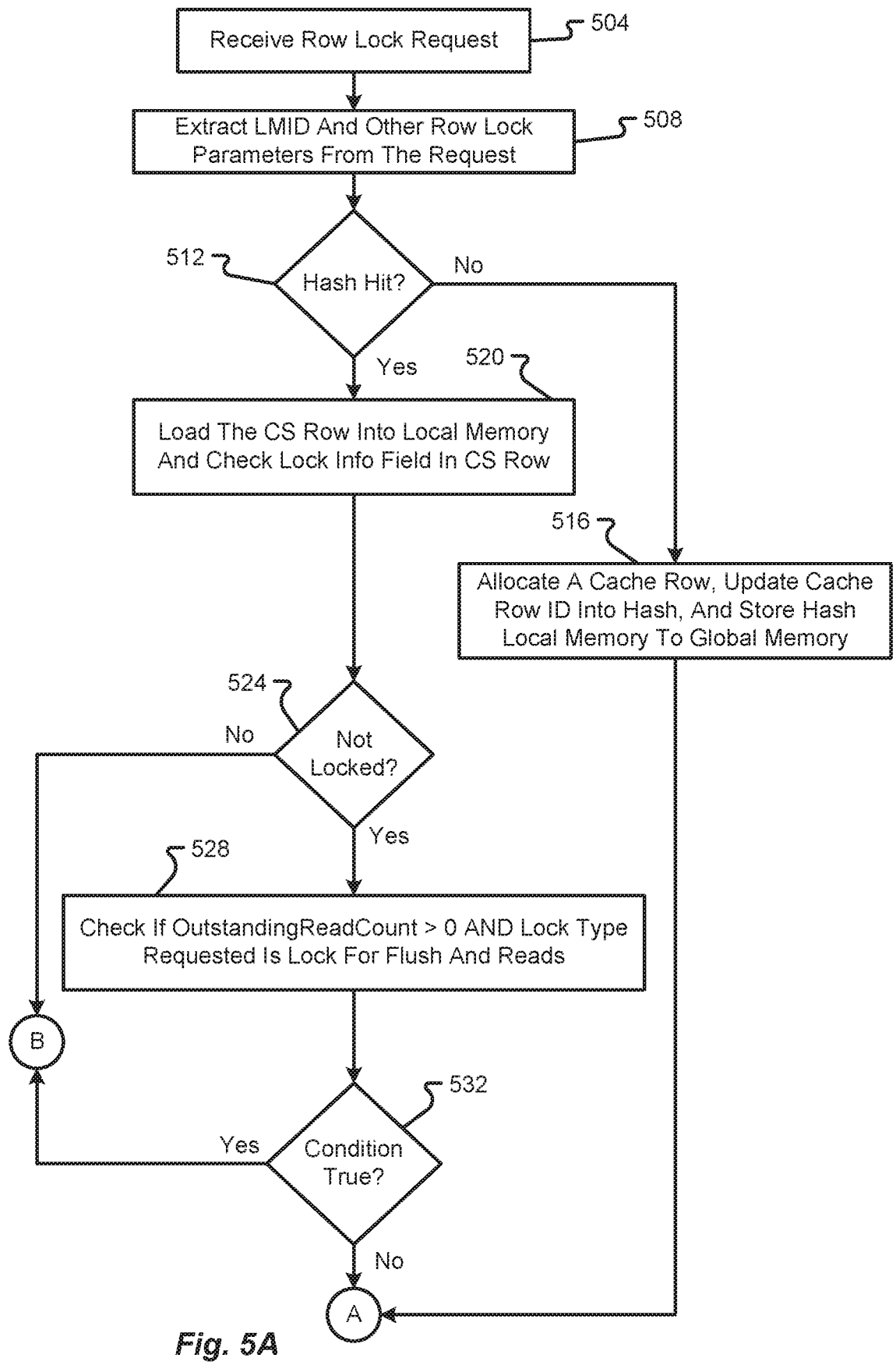
FIG. 5A is a first portion of a flow diagram depicting a method of processing a row lock request in accordance with embodiments of the present disclosure.
Figure 5B:
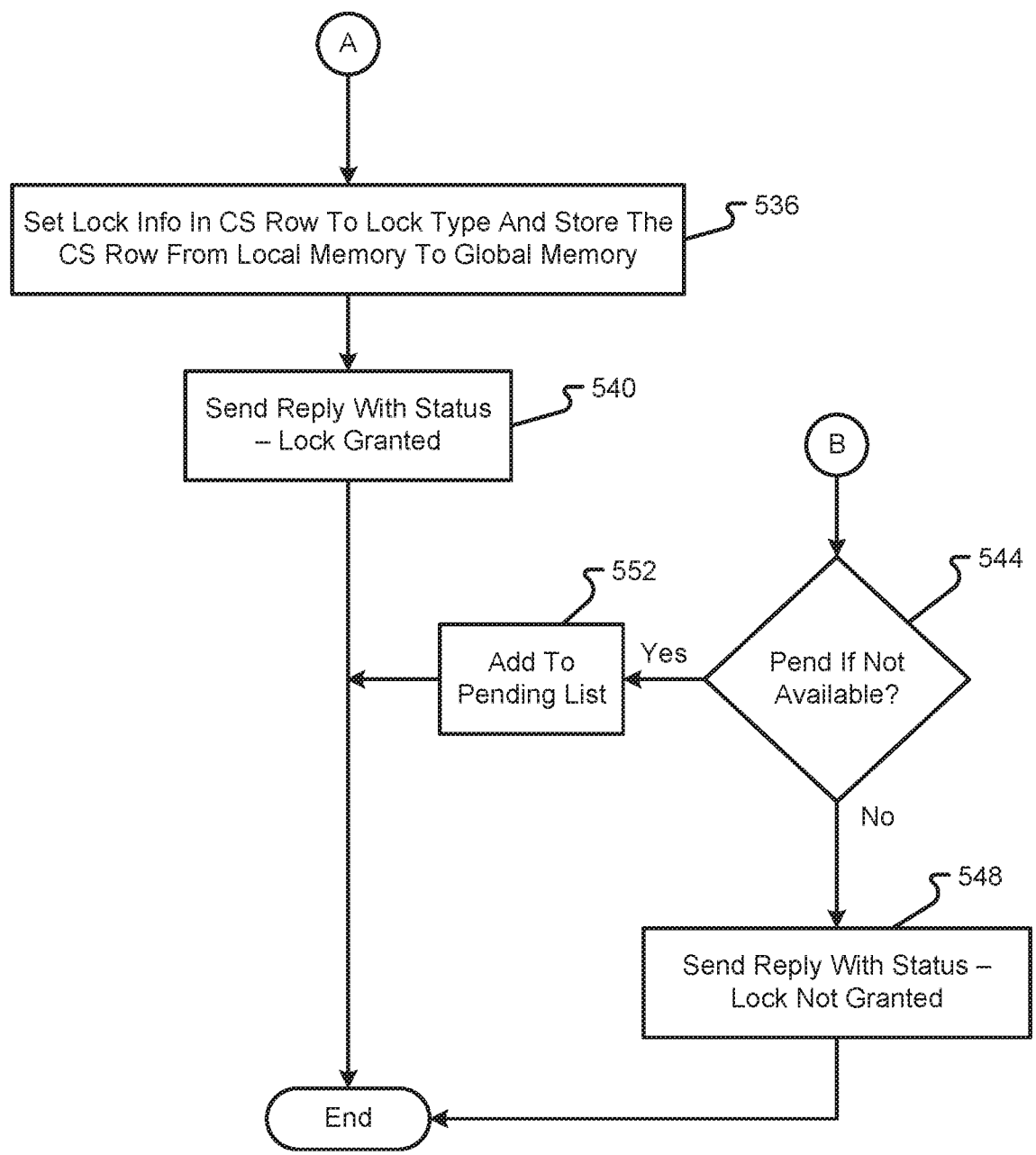
FIG. 5B is a second portion of the flow diagram in FIG. 5A.

With reference now to FIGS. 5A and 5B, a method of receiving and responding to a row lock request will be described in accordance with at least some embodiments of the present disclosure. The method begins when a row lock request is received in hardware (step 504). In some embodiments, the method is initiated when a requester allocates a message frame (e.g., similar to data structure 400) and fills the data structure 400 with an Ld number, Stripe Number, Span Number, LockType (Lock for Flush or Lock for Flush and Read), PendIfNotAvailable flag, and so on. The data structure 400 is transmitted to hardware either by itself or as part of a larger message. A row lock module operating within the cache manager 252 may receive the request and extract the relevant LMID (e.g., data structure 400) from the request. The row lock module may also extract other row lock parameters from the data structure 400 (step 508). For simplicity of understanding, the row lock request will be described in connection with locking a single row although it should be appreciated that embodiments of the present disclosure can be extended to support a request for concurrently locking multiple rows.

The row lock module may extract the following information from the data structure 400: LdNumber, StripeNumber, SpanNumber, NumRows and LockType. As discussed above, these parameters may be contained in within the data structure 400, which may be referred to herein as a row lock request LMID. In some embodiments, the row lock module may determine that the current row number is equal to the span number plus the product of the stripe number and number of spans in the LD.

The row lock module may utilize this extracted and determined information to perform a hash analysis. Specifically, the row lock module may analyze the hash slot to determine if the row identified in the LMID is present (e.g., look for a "hash hit") (step 512). If a hash hit is found, then the row lock module loads the cache segment row into local memory 208 and checks the lock information field for the CS row (step 520). In particular, the row lock module will obtain the cache row ID from the hash slot, check the lock information field in cache row, and determine if the cache row is currently locked or not (step 524). If the lock information field indicates that the row is not locked (e.g., the condition of step 524 is determined to be true), then the row lock module will check if the outstanding read count is greater than zero and if the lock type request indicates a "lock for flush and read" (step 528). If this condition is determined to be true, then the method proceeds to step 544 in FIG. 5B. Otherwise, the method proceeds to step 536 in FIG. 5B.

Specifically, if the condition is not true, then the row lock request is granted as follows. The cache row is removed from the dirty list, but is maintained as valid for write back volumes. The lock information field of the data structure 300 is set to indicate a lock type and the lock owner field is set with the owner ID (e.g., identifying the requestor of the row lock request). All of this information for the data structure 300 may be maintained in local memory of the controller 108 (step 536). The method then proceeds with the row lock module sending back a reply to the requestor indicating that the row lock has been granted (step 540). The method then ends.

Referring back to step 532 and 524, if either of these conditions indicate that the row is locked or not available for an immediate lock, then the method continues with the row lock module adding the request LMID to a pending list, if possible (step 544). The row lock module will determine if the operation type is a write and then check if the pending list write tail is invalid (e.g., empty). If the pending list write tail is invalid, then the operation is added at the end of the pending list (step 552). If the option of pending the row lock request is not available, then the method proceeds to step 548 where the row lock module replies to the requestor with a status that the row lock was not granted. The method then ends.

Figure 6:
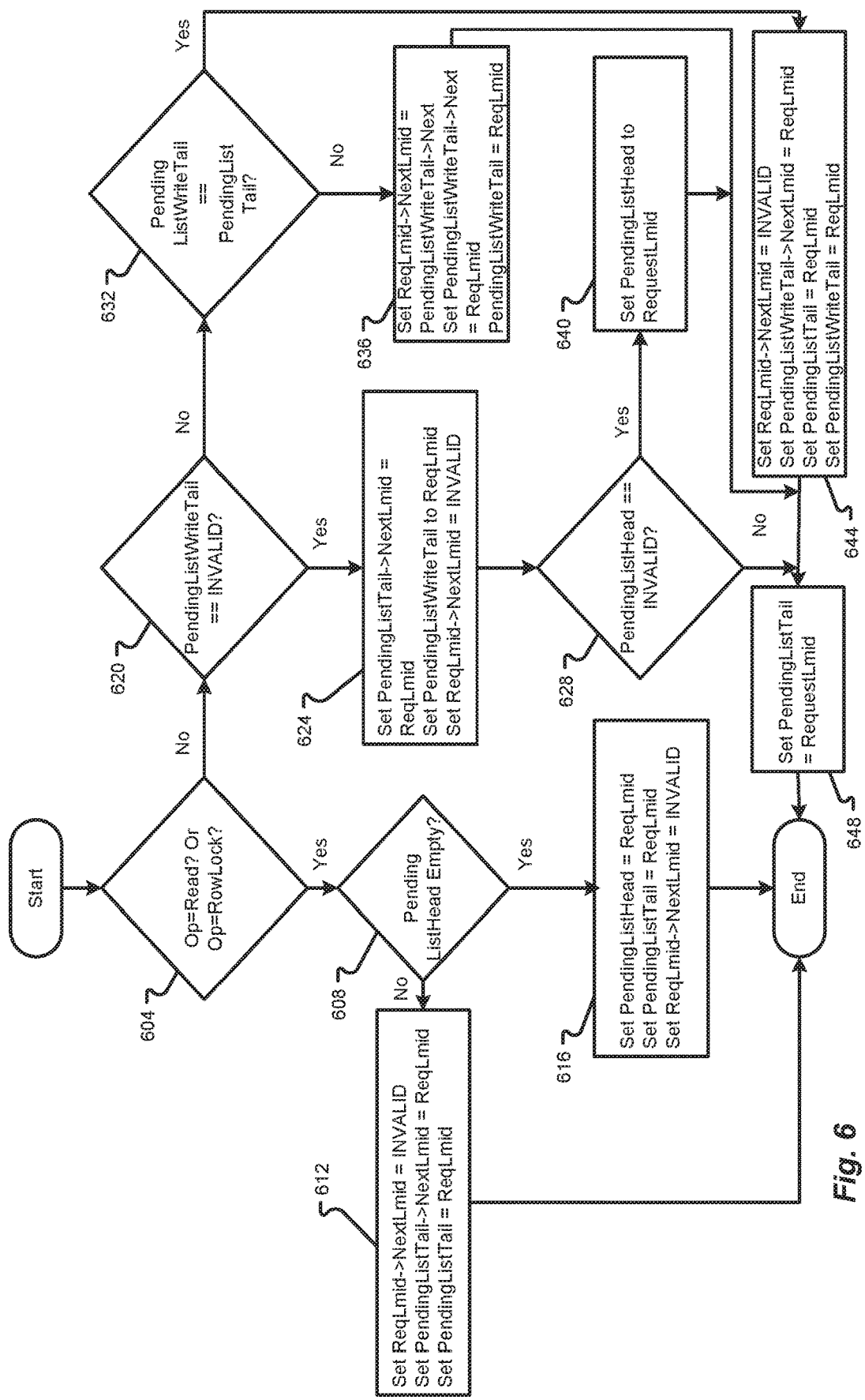
FIG. 6 is a flow diagram depicting a method of updating a pending list in accordance with at least some embodiments of the present disclosure.

Referring now to FIG. 6, additional details of adding a request to a pending list (e.g., performing step 552) will be described in accordance with at least some embodiments of the present disclosure. With reference to FIG. 6 and other figures, notation such as Lmid→Next or Lmid→NextLmid means that the NextLmid field is placed into the current Lmid frame. The method begins with the row lock module determining whether the operation type indicates a read or row lock request (step 604). If so, then the row lock module will determine if the pending list head is empty or not (step 608). If the pending list head is empty, then the pending list head and the pending list tail are updated (step 616) In this step, the pending list head and pending list tail are updated with the ReqLmid and the NextLmid field in ReqLmid is set to INVALID. If the pending list head is not empty, the row lock module will set the pending list tail and the ReqLmid (step 612). In particular, the row lock module does the following in this step: (1) NextLmid field of ReqLmid is updated with INVALID; (2) NextLmid field of PendingList- Tail is updated with ReqLmid; and (3) PendingListTail is updated with ReqLmid Thereafter, the process ends.

Referring back to step 604, if the query is answered negatively, then the row lock module continues by determining if the pending list write tail is set to INVALID (step 620). If this query is answered positively, then the row lock module sets the pending list write tail as follows (step 624): (1) Setting PendingListWriteTail=ReqLmid; (2) Setting the NextLmid from ReqLmid to INVALID; and (3) Setting NextLmid field in PendingListTail=ReqLmid. In this step, if the PendingListTail is determined to be invalid, then the NextLmid field of PendingListTail is updated with ReqLmid, PendingListWriteTail is updated with ReqLmid and the NextLmid field of ReqLmid is set to INVALID. The row lock module will then determine if the pending list head is INVALID (step 628). If the PendingListHead is not INVALID then the method steps the PendingListTail to the ReqLmid (step 648) and then the method ends. However, if the PendingListHead is set to INVALID then the row lock module sets the PendingListHead=ReqLmid (step 640).

Referring back to step 620, if the write list is not empty (e.g., the pending list write tail is not INVALID), then the row lock module will check if the pending list write tail is the same as the pending list tail (step 632). If they are the same, then the row lock module will perform the following at step 644: (1) Setting ReqLmid→Next=INVALID (2) Setting PendingListWriteTail→Next=ReqLmid; (3) Setting PendingListWriteTail=ReqLmid; and (4) Setting PendingListTail=ReqLmid.

At step 632, if the pending list write tail is not the same as the pending list tail, then the ReqLmid is inserted after the pending list write tail as part of executing step 636. Specifically, the row lock module will: (1) Set ReqLmid→Next=PendingListWriteTail→Next; (2) Set PendingListWriteTail→Next=ReqLmid; and (3) Set PendingListWriteTail=ReqLmid.

Figure 7:
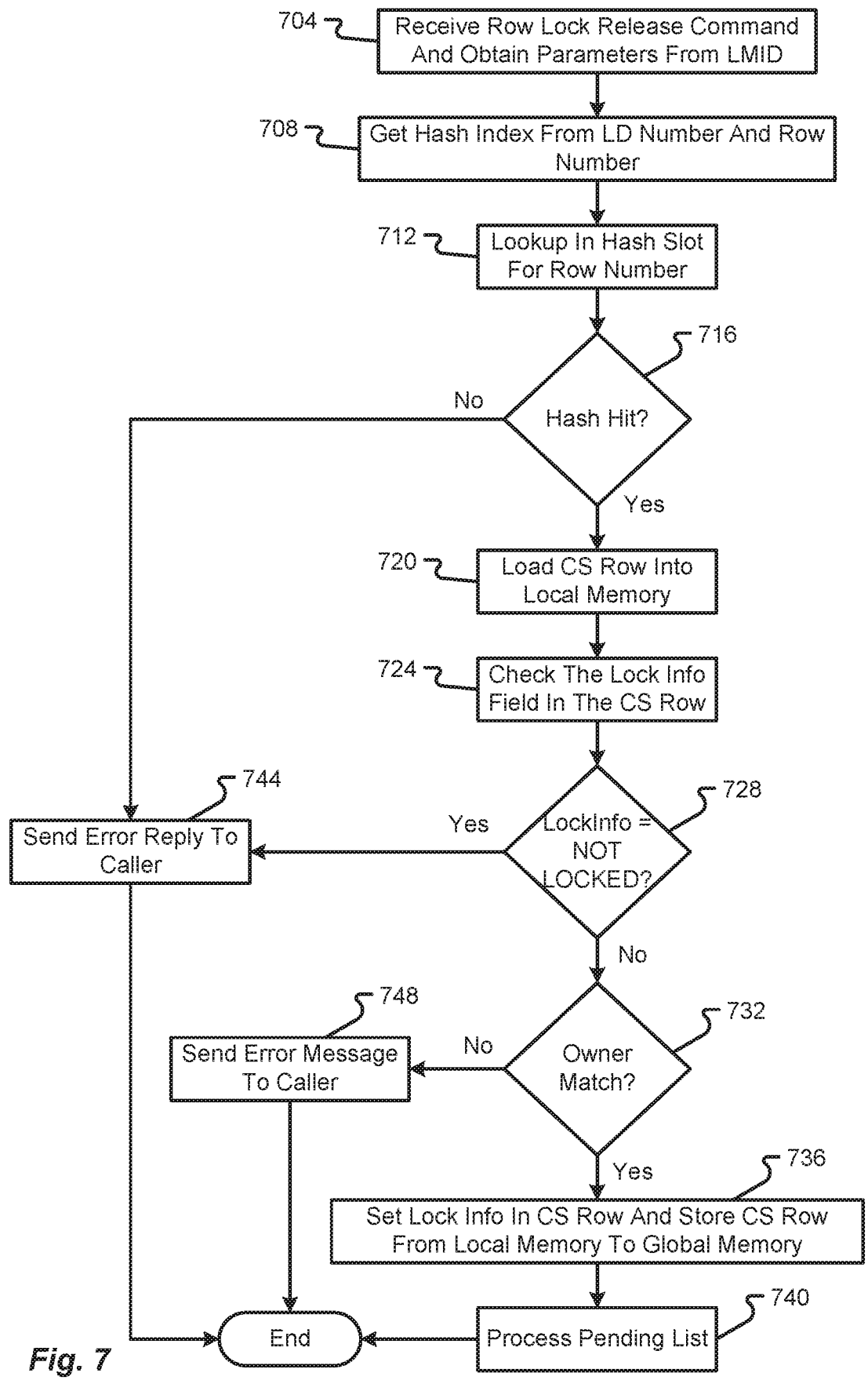
FIG. 7 is a flow diagram depicting a method of performing a row lock release in accordance with at least some embodiments of the present disclosure.

With reference now to FIG. 7, a method of performing a row lock release will be described in accordance with at least some embodiments of the present disclosure. The method begins when a row lock release command is received at the cache manager 252 (step 704). The command may be received in the form of a row lock release LMID and may contain an Ld number, a row number and OwnerId of the requesting module. Upon receiving the command, the cache manager 252 or a row lock module within the cache manager 252 will extract parameters from the LMID, such as the Ld number and row number.

The row lock module will continue by computing the hash index from the Ld number and row number (step 708). Thereafter, the row lock module will perform a hash lookup in which the row lock module references the hash slot based on the computed hash index to determine if the row number is present (step 712). If this analysis indicates that no hash hit has occurred (step 716), then it also is inferred that there is no row lock outstanding and hence it is an invalid request. In this situation, an error reply is sent to the requestor (step 744) and the method ends.

Referring back to step 716, if there is a hash hit, then the row lock module obtains the row number from the hash slot and loads the CS row into local memory (step 720). The row lock module then checks the lock information field to determine if the row is locked (steps 724 and 728). If the row is not locked then the request for release is not valid and the method proceeds to step 744.

If the row is locked, then the owner field is checked from the CS row (step 732). If the owner field is not the same as indicated in the current request, then an error message is transmitted to the caller indicating that the row is currently locked by some other module (step 748).

If this owner is matched (e.g., the entity requesting the row lock release corresponds to the current owner of the row lock), then the lock is acceptable for release. In this instance, the row lock module will set the lock information for the CS row as NOT_LOCKED and store the CS row from local memory back to global memory, thereby releasing local memory for other processes (step 736). Thereafter, the pending list is processed (step 740). The processing of the pending list in this step corresponds to a method in which requests in the pending list are unpended. Specifically, the process of step 740 contains a number of sub-steps, which are described below.

First, the Lmid is set to PendingListHead. Thereafter, the opcode for the Lmid is checked to determine if the opcode is set as a READ, WRITE, or ROW_LOCK. If the opcode is identified as a WRITE, then it is determined if the outstanding read count is equal to zero. If so, then the following is performed: (1) Set ActiveListPtr=PendingListHead; (2) PendingListHead=PendingListWriteTail→Next; (3) PendingListWriteTail→Next=INVALID; (4) PendingListWriteTail=INVALID; (5) Issue Flush request on the Row; and then (6) complete the processing of the pending list.

On the other hand, if the opcode indicates WRITE, but the outstanding read count is not equal to zero, then the pending list head is updated to reflect the next Lmid that needs to be processed. For instance, the PendingListHead is set equal to Lmid→Next and then the process ends.

If the opcode is not a WRITE, then the opcode is checked to determine if it corresponds to a READ request. If it is a READ, then the Lmid is submitted to a cache scan module to process the read request and the outstanding read count is incremented by 1. The row lock module will then move to the next Lmid (e.g., Lmid=Lmid→Next) and the sub-steps of processing the pending list are performed again. However, if the Lmid is the last one, then the sub-steps of the process are ended by setting the PendingListHead, PendingListWriteTail, and PendingListTail all to INVALID.

If the opcode is not WRITE and not READ then the opcode is checked to determine if it corresponds to ROW_LOCK request. If the opcode indicates it is a ROW_LOCK request, then the row lock request is processed as in step 820, which will be described in further detail herein. Then set the PendingListHead=Lmid→Next as in step 824.

Figure 8A:
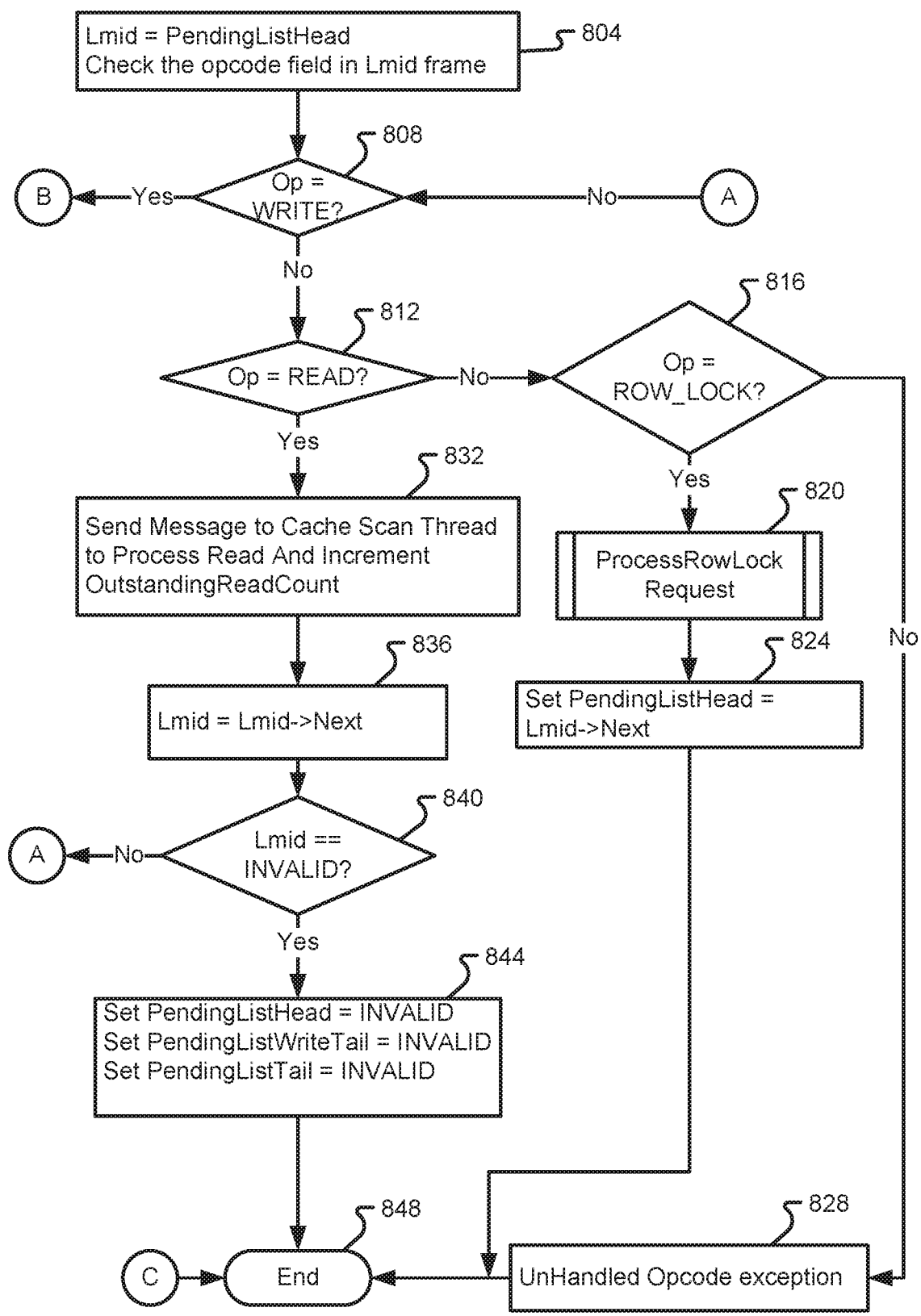
FIG. 8A is a first portion of a flow diagram depicting a method of processing a pending list in accordance with at least some embodiments of the present disclosure.
Figure 8B:
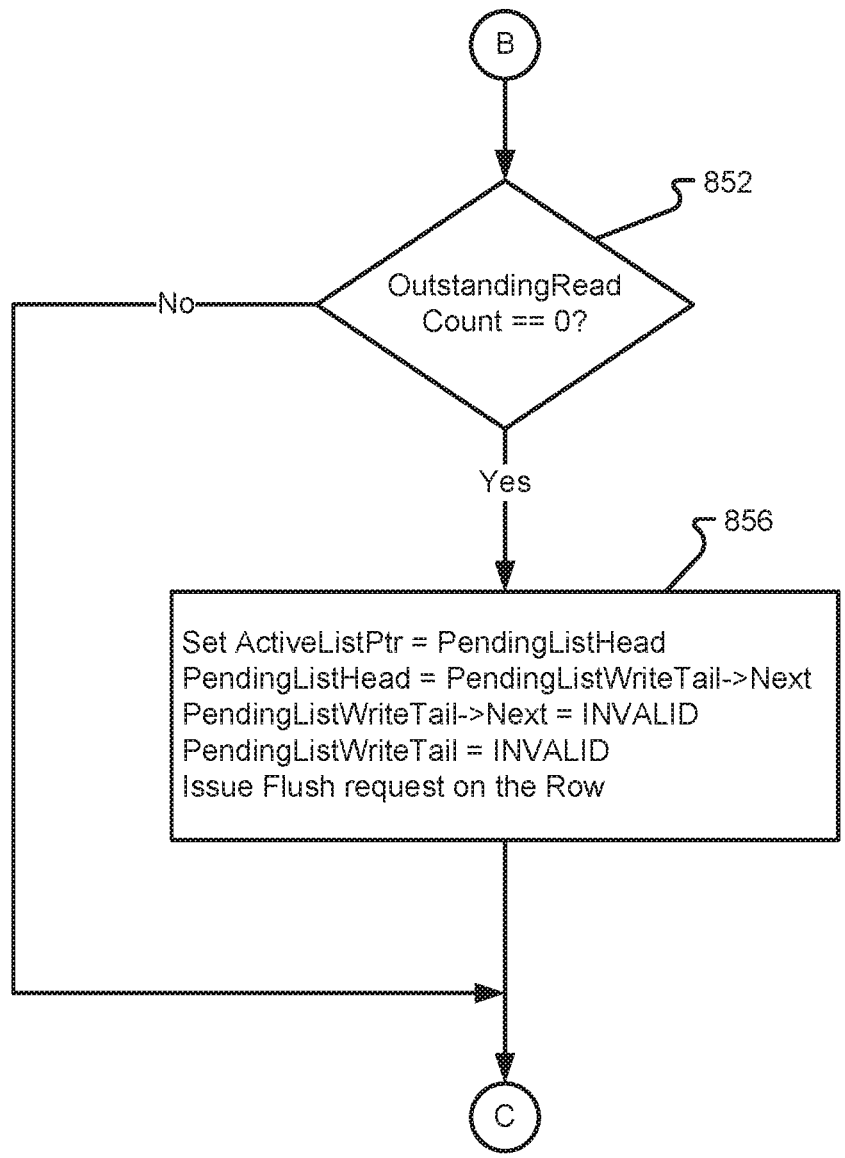
FIG. 8B is a second portion of the flow diagram of FIG. 8A.

Referring concurrently now to FIGS. 8A-8B, a method of processing pending lists will be described in accordance with at least some embodiments of the present disclosure. The method begins when an LMID or similar type of message/command identifying the PendingListHead is received at a row lock module (step 804). When such an LMID is received, the row lock module will check the opcode field in the LMID data structure and first check to see if the opcode indicates a WRITE command (step 808). If the opcode indicates a WRITE command, then the row lock module will check the outstanding read count and determine if the count equals zero (step 852). If the answer to this query is negative, then the processing ends here. If the query of step 852 was answered positively, then the method continues with the row lock module setting a number of parameters to new values. In particular, the row lock module will: (1) set the ActiveListPtr equal to the PendingListHead value; (2) increment the PendingListHead to the next PendingListWriteTail value; (3) set the next PendingListWriteTail value to INVALID; (4) set the PendingListWriteTail value to INVALID; and (5) issue a flush request on the row identified in the LMID (step 856). After execution of step 856, the method ends at step 848.

Referring back to step 808, if the query is answered negatively, then the row lock module determines if the opcode equals a READ command (step 812). If this query is answered negatively, then the row lock module determines if the opcode indicates a ROW_LOCK command (step 816). A negative answer to this query results in the row lock module indicating that the LMID has an unhandled opcode exception and passes the LMID back to the requestor (step 828). The method thereafter ends.

Referring back to step 816, if the opcode indicates a ROW_LOCK, then the row lock module will process the row lock request (step 820). As can be appreciated, the processing of a row lock request may follow the protocol depicted and described in connection with FIGS. 5A and 5B. Once processed, the row lock module will set the PendingListHead value to the value indicated in the LMID→Next (step 824). Thereafter, the method ends.

Referring back to step 812, if the opcode indicates a READ, then the row lock module will send a message to a cache scan thread to process the read and increment the outstanding read count value (step 832). The row lock module then begins processing the next LMID (step 836). The row lock module determines if the next LMID is INVALID. If this query is answered negatively, then the method returns to step 808. If this query is answered positively, then the method continues with the row lock module setting the PendingListHead, PendingListWriteTail, and PendingListTail values all to INVALID (Step 844). Thereafter, the method ends (step 848).

With reference now to FIGS. 9A-I, a method of processing read or write(flush) requests will be described in accordance with at least some embodiments of the present disclosure. A write request on a write back volume will get completed after caching the host data without the need to write the data onto the drives. A write on a Raid 5 write through volume will result in a flush request after the host data is cached. In some embodiments, the row lock module would request a row lock with a lock for flush option so that no other flush can be active until the current flush is completed. So another write request gets pended and added to the write pending list.

Conversely, when a read request is received, if the row is not locked or if it is locked with an indication of "locked for flush" the I/O is issued with the outstanding read count being incremented in the cache row. On the other hand if the row is "locked for flush and read" then the read request is added to the PendingListTail. This will be replayed after the row is unlocked. On degraded volumes, the lock type that may be requested is lock for flush and read. FIGS. 9A-I depict an example of how write and read requests are processed when a row is already locked for flush.

Figure 9A:
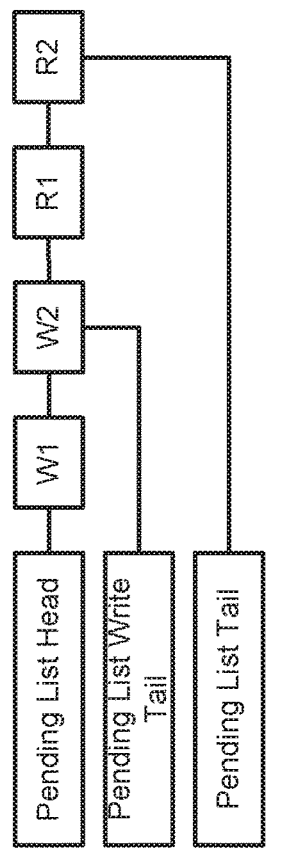
FIG. 9A is a block diagram depicting a data structure in a first state.

FIG. 9A shows I/O requests W1 and W2 being received when a row indicated in those requests is already locked for flush and read. In this situation, the I/O requests W1 and W2 are added to the Pending List Write Tail. Additionally, since the Pending List Head is empty, the Pending List Head and Pending List Tail will also be set to W1. The second write request W2 represents a write request received after the first write request W1. In such an example, W2 is added after or behind W1. PendingListTail is further updated with W2. These two are added to PendingListWriteTail. PendingListTail will be updated with W2.

Figure 9B:
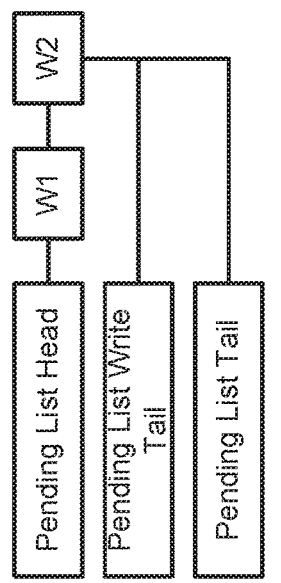
FIG. 9B is a block diagram depicting a data structure in a second state.

Next, as shown in FIG. 9B, a read request R1 is received after write requests W1 and W2. This request R1 is added to the PendingListTail (e.g., after W2.) PendingListWriteTail will remain same. Yet another read request R2 is received after R1 and, therefore, is added behind R1. PendingListTail is further updated with R2.

Figure 9C:
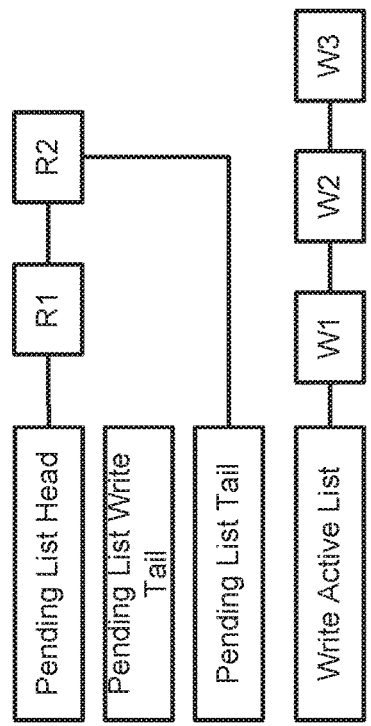
FIG. 9C is a block diagram depicting a data structure in a third state.

Next, as shown in FIG. 9C, a new write request W3 is received. This request is inserted after W2 and before the read requests R1 and R2. Said another way, the write requests are maintained in sequence and all before the read requests R1 and R2.

Figure 9D:
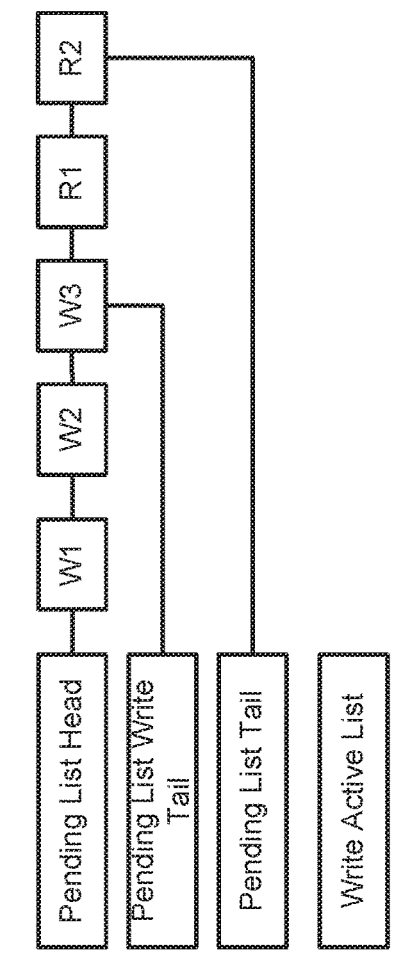
FIG. 9D is a block diagram depicting a data structure in a fourth state.

At FIG. 9D, the row is unlocked. Since the first request in the Pending List Head is a write request (e.g., W1), the write list is moved to the active write list, the write list is detached after W3, and a flush request is issued for the row. Since the lock type is specific to a lock for flush and reads, the read requests R1 and R2 need to still wait until the lock is released. Pending List Head now points directly to R1.

Figure 9F:
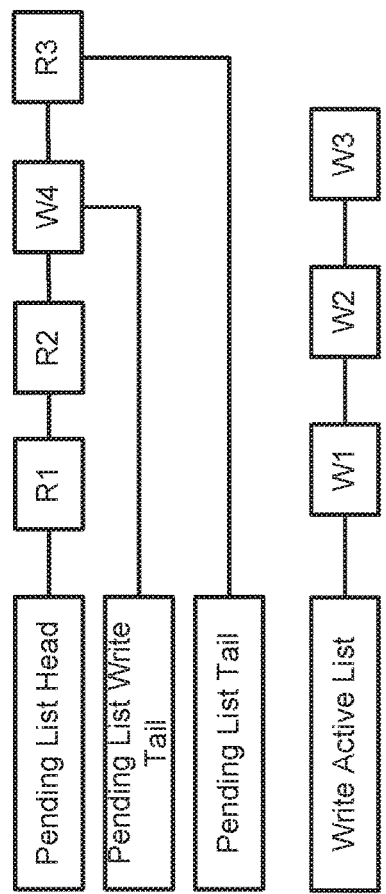
FIG. 9F is a block diagram depicting a data structure in a sixth state.
Figure 9E:
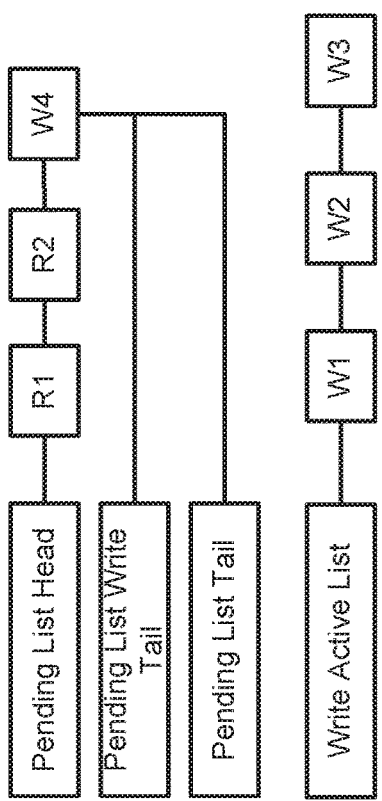
FIG. 9E is a block diagram depicting a data structure in a fifth state.

As seen in FIG. 9E, another write request W4 is received. Since PendingListWriteTail is empty, the newest write request W4 is added to the end of the list (e.g., to PendingListTail). The write request W4 is added next to R2. PendingListWriteTail and PendingListTail re updated with W4.

In FIG. 9F, a read request R3 is received. R3 is added after W4. PendingListTail is updated with R3. Thereafter, in FIG. 9G, the flush on the row completes. At this point, all the requests W1, W2, W3 are completed to host 104. Now read request R1 and R2 are submitted back to cache scan with the OutstandingReadCount incremented to 2 (1 for each read request). The other requests, W4 and R3 remain in the pending list.

Figure 9H:
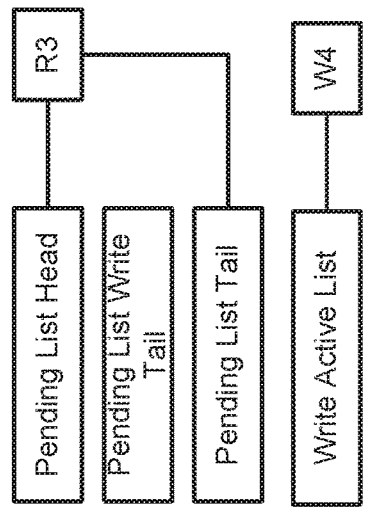
FIG. 9H is a block diagram depicting a data structure in a eighth state.
Figure 9G:
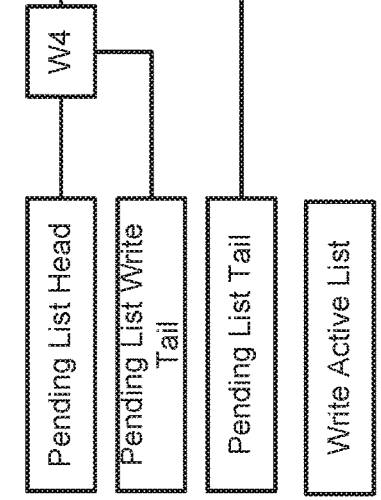
FIG. 9G is a block diagram depicting a data structure in a seventh state.
Figure 9I:
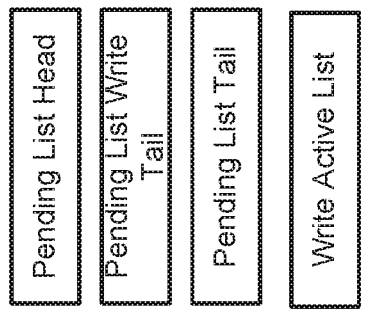
FIG. 9*i* is a block diagram depicting a data structure in a first state.

Once the read requests R1 and R2 get completed as shown in FIG. 9H, the OutstandingReadCount becomes zero. At this point the PendingListHead contains a write request. Hence W4 is moved to active list and a flush request is submitted for the row. Once the flush completes on the row, the last read request R3 is submitted with an OutstandingReadCount being incremented to 1. After R3 completes OutstandingReadCount is decremented to 0 and the lists are empty as shown in FIG. 9I.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method for hardware accelerated row lock for a write back volume, the method comprising:
    maintaining a data structure in connection with a plurality of blocks used for data caching, the data structure including a row lock wait list section;
    receiving an Input/Output (I/O) request, wherein the I/O request comprises a read request;
    performing a hash search for the I/O request against the data structure;
    based on the results of the hash search, locking at least one row in a data cache thereby preventing read and write operations from being performed on the at least one row until the at least one row is unlocked;

processing the read request through a hardware automated path;

determining whether or not the read request is related to a degraded volume of memory; and in response to determining that the read request is related to a degraded volume of memory, restricting flush requests from being performed on the degraded volume while the row lock is in place for the at least one row.

2. The method of claim 1, further comprising:

removing that at least one row from a dirty list;

setting a lock information field in the data structure to indicate a lock type;

populating a lock owner field in the data structure with information that identifies an owner of the locked at least one row; and sending a reply back to a requestor that transmitted the I/O request, wherein the reply indicates that the at least one row has been locked.

3. The method of claim 1, wherein the I/O request further comprises a write request.

4. The method of claim 3, further comprising:

receiving a row lock release command;

obtaining at least one of a row number and Ld number from the row lock release command;

obtaining a hash index from the at least one of a row number and LD number;

comparing the hash index in a hash slot to determine if a corresponding row number is present within the hash slot; and only releasing the row lock if the row number is found to be present within the hash slot.

5. The method of claim 1, wherein the at least one row comprises a plurality of rows.

6. A memory control system, comprising:

a host interface that receives one or more host Input/Output (I/O) commands;

a storage interface that enables communication with a plurality of storage devices configured in a storage array;

a microprocessor; and memory that includes computer-readable instructions that are executable by the microprocessor, the instructions enabling performance of a row lock and including:

instructions that maintain a data structure in connection with a plurality of blocks used for data caching, the data structure including a row lock wait list section;

instructions that receive an Input/Output (I/O) request, wherein the I/O request comprises a read request;

instructions that perform a hash search for the I/O request against the data structure;

instructions that, based on the results of the hash search, lock at least one row in a data cache thereby preventing read and write operations from being performed on the at least one row until the at least one row is unlocked;

instructions that process the read request through a hardware automated path;

instructions that determine whether or not the read request is related to a degraded volume of memory; and instructions that, in response to determining that the read request is related to a degraded volume of memory, restrict flush requests from being performed on the degraded volume while the row lock is in place for the at least one row.

7. The memory control system of claim 6, wherein the instructions further comprise:

instructions that remove that at least one row from a dirty list;

instructions that set a lock information field in the data structure to indicate a lock type;

instructions that populate a lock owner field in the data structure with information that identifies an owner of the locked at least one row; and instructions that send a reply back to a requestor that transmitted the I/O request, wherein the reply indicates that the at least one row has been locked.

8. The memory control system of claim 6, wherein the I/O request further comprises a write request.

9. The memory control system of claim 8, wherein the instructions further comprise:

instructions that receive a row lock release command;

instructions that obtain at least one of a row number and Ld number from the row lock release command;

instructions that obtain a hash index from the at least one of a row number and LD number;

instructions that compare the hash index in a hash slot to determine if a corresponding row number is present within the hash slot; and instructions that only release the row lock if the row number is found to be present within the hash slot.

10. The memory control system of claim 6, wherein the at least one row comprises a plurality of rows.

11. A cache system, comprising:

cache memory;

a processor coupled to the cache memory; and processor-executable instructions stored in computer memory that enable of the processor to manage the cache memory to facilitate a row lock to be performed, the instructions including:

instructions that maintain a data structure in connection with a plurality of blocks used for data caching, the data structure including a row lock wait list section;

instructions that receive an Input/Output (I/O) request, wherein the I/O request comprises a read request;

instructions that perform a hash search for the I/O request against the data structure;

instructions that, based on the results of the hash search, lock at least one row in a data cache thereby preventing read and write operations from being performed on the at least one row until the at least one row is unlocked;

instructions that process the read request through a hardware automated path;

instructions that determine whether or not the read request is related to a degraded volume of memory; and instructions that, in response to determining that the read request is related to a degraded volume memory, restrict flush requests from being performed on the degraded volume while the row lock is in place for the at least one row.

12. The cache system of claim 11, wherein the instructions further comprise:

instructions that remove that at least one row from a dirty list;

instructions that set a lock information field in the data structure to indicate a lock type;

instructions that populate a lock owner field in the data structure with information that identifies an owner of the locked at least one row; and instructions that send a reply back to a requestor that transmitted the I/O request, wherein the reply indicates that the at least one row has been locked.

13. The cache system of claim 11, wherein the instructions further comprise:
- instructions that receive a row lock release command;
- instructions that obtain at least one of a row number and Ld number from the row lock release command;
- instructions that obtain a hash index from the at least one of a row number and LD number;
- instructions that compare the hash index in a hash slot to determine if a corresponding row number is present within the hash slot; and
- instructions that only release the row lock if the row number is found to be present within the hash slot.

14. The cache system of claim 11, wherein the I/O request further comprises a write request.

15. The method of claim 1, wherein the at least one row comprises a single row.

16. The memory control system of claim 6, wherein the at least one row comprises a single row.

17. The cache system of claim 11, wherein the at least one row comprises a single row.

18. The cache system of claim 11, wherein the at least one row comprises a plurality of rows.

\* \* \* \* \*